March 13, 1934. J. P. KIESECKER Re. 19,112

METAL FURNITURE

Original Filed June 11, 1932 3 Sheets-Sheet 1

INVENTOR
JULES P. KIESECKER
BY Langdon Morris
ATTY.

March 13, 1934. J. P. KIESECKER Re. 19,112

METAL FURNITURE

Original Filed June 11, 1932 3 Sheets-Sheet 2

INVENTOR
JULES P. KIESECKER
BY Langan Mann
ATTY.

March 13, 1934. J. P. KIESECKER Re. 19,112

METAL FURNITURE

Original Filed June 11, 1932 3 Sheets-Sheet 3

INVENTOR
JULES P. KIESECKER
BY Langdon Morn
ATTY.

Reissued Mar. 13, 1934

Re. 19,112

UNITED STATES PATENT OFFICE 19,112

METAL FURNITURE

Jules P. Kiesecker, New York, N. Y.

Original No. 1,934,195, dated November 7, 1933, Serial No. 616,624, June 11, 1932. Application for reissue December 7, 1933, Serial No. 701,360

11 Claims. (Cl. 155—194)

This invention relates to fireproof furniture and more particularly to furniture of this type constructed with a metal frame with coverings of fireproof material.

Commercial metal furniture of today is usually all metal which follows the shapes employed in wooden furniture without actually representing wood and employs hair, down and other materials in the upholstery which are inflammable in the sense that such upholstery can produce suffocating smoke.

It is an object of this invention to construct fireproof furniture particularly adaptable for use on shipboard as in spaces enclosed by fireproof partitions, such as state rooms, as well as in public places of the vessel. It is also an object of this invention in constructing this improved fireproof furniture to combine metal structural forms with compressed fireproof materials disguising the coldness and obviating the tin pan sound so common to the ordinary types of metal furniture. It is still a further object of this invention to provide furniture of this type which may be covered with fabric or wood veneer or provided with a combination of wood veneer surfaces with polished metal, which is very popular at the present time, so that the outward appearance of the furniture can be so constructed and decorated as to correspond with any architectural or decorative scheme and at the same time possessing the quality of being practically a complete fireproof article.

While the preferred forms of this invention are illustrated in the accompanying sheets of drawings, yet it is to be understood that minor detail changes may be made without departing from the scope thereof.

In carrying out this invention, it is contemplated to employ commercial metal structural forms for the main supporting members which are interlocking in character and spot-welded together.

Figure 1:
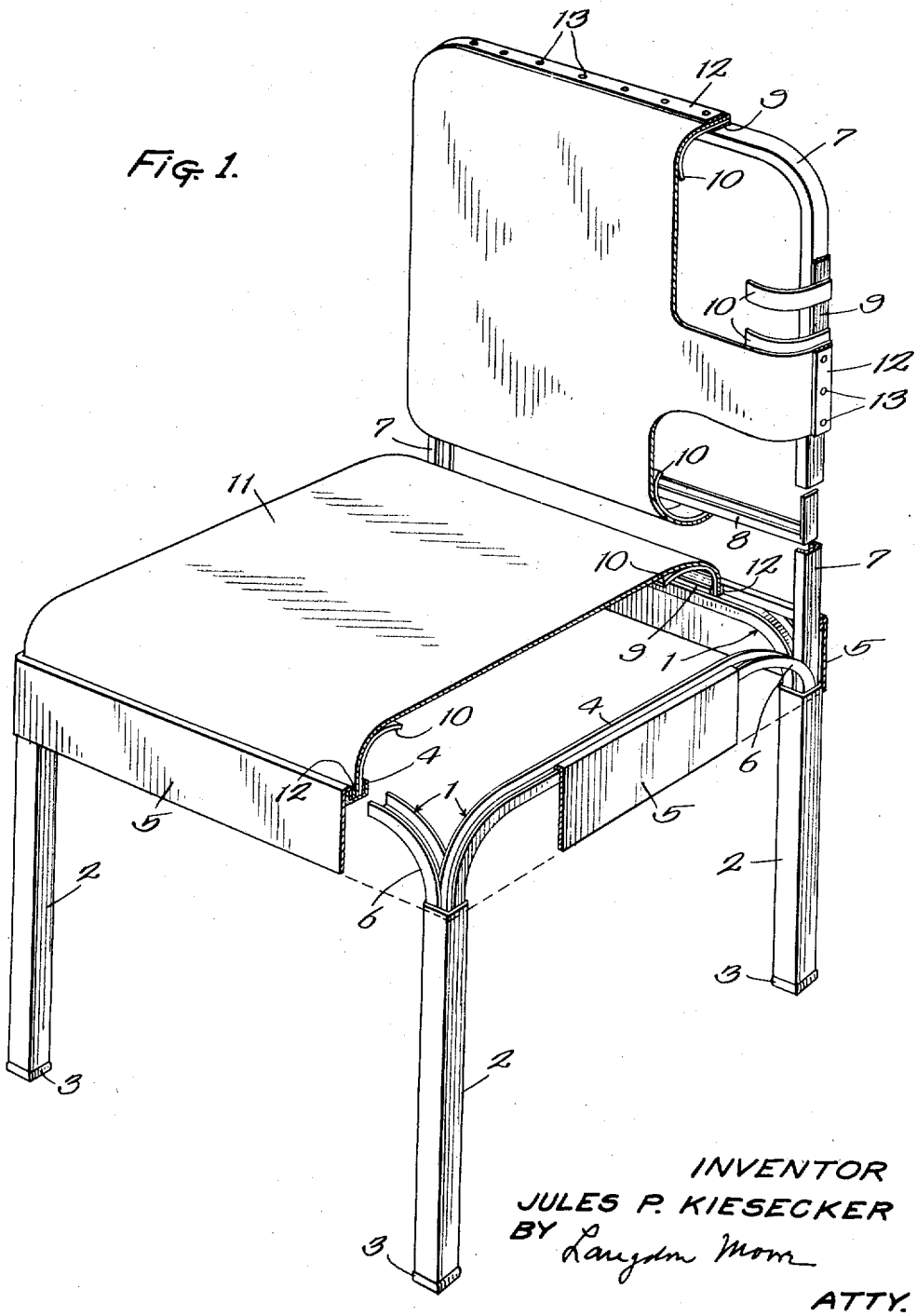
Figure 1 is a view in perspective, with parts broken away and partly in section, illustrating an embodiment of this invention as applied to a chair.

In the embodiment illustrated in Figure 1 of the drawings, the stiffness and necessary strength of the chair illustrated therein is obtained by forming a frame of four bent channels 1 each in the form of a flat arch having their flanges extending upwardly and outwardly and arranged so that the channels forming the sides of the frame will telescope between the flanges forming the front and back of the frame and in the telescoped position secured to each other preferably by spot-welding. It is preferable to encase the telescoping portions of the respective channels forming the legs of the chair in a thin metal envelope 2, which may be spot-welded thereto, to provide a uniform finish. A small metal casting acting as a foot 3 is preferably attached to the bottom of each leg, the dimensions of the bottom of which is slightly greater than the envelopes of the legs to extend therebeyond and act as a protection to the finish or decoration of the envelopes.

The upper flat portions 4 of the channels form the frame between the legs to support the seat for the chair. It is preferable to provide a rectangular frame 5 of thin metal having its upper edge turned back upon itself to hook over and be supported by the outer flanges of the respective flat channel portions 4 and depend a sufficient distance therebelow to cover the curved portions 6 of the respective channels and the upper ends of the metallic leg envelopes 2. This thin metallic frame as shown is preferably secured in position by spot-welding it to the flanges of the respective channels.

The posts for the back of the chair are of the same construction as the legs, that is, formed of a continuous channel 7 bent to the shape desired, but in this case, it is preferable to have the flanges extending inward as shown. The ends of this back channel are received within the hollow back legs of the chair formed by the interlocking channels 1 and are preferably spot-welded thereto. A horizontal strut, or brace, preferably in the form of a channel 8, with its flanges extending upwardly and cut away at each end to allow the web to be bent upwardly, is received between the inturned flanges of the channel forming the back posts and is preferably spot-welded thereto.

It is seen from the above description that the entire frame of the chair is formed of light weight rigid metal structural shapes. This invention contemplates the formation of the back and seat of the chair of molded compressed fireproof material of flexible character. In supporting and attaching this material in place, it is contemplated to employ a metal strip 9 readily bent to conform to the shape of the chair back, or chair seat, to which strip a plurality of spaced apart spring clips 10 are preferably spot-welded for the purpose of imparting the desired shape to the covering of the back or seat. The flexible fireproof covering 11 is then stretched over these clips and is preferably secured in place by an exterior metal band 12 placed about the edge thereof. In the formation of the chair back the exterior metal securing band 12 preferably holds the fabric stretched over the spring clips and the spring clip bearing strip 9 by spaced apart screws 13 passing through both and engaging the web of the back channels 7 and 8. The seat is preferably constructed in the same manner in which the exterior edges of the metal strip 9 and band 12 on each side of the fabric covering are secured between the portion of the chair frame 5 overlapping the exterior flange of the frame channels 1 and the oppositely disposed flange, as shown. If desired, cross straps may be secured to the opposite portions of the depending chair frame for the purpose of mounting coil springs under the desired portion of the seat covering.

The exposed metal portions of the chair may be decorated in any desired manner, including the application of a wood veneer without departing from the fireproof qualities of the metal structure. The seat and back portions may be covered with leather or other decorative material before they are secured in position and in this connection, it is preferable to stretch a covering for the rear of the back over the channels before securing the back thereto.

Figure 2:
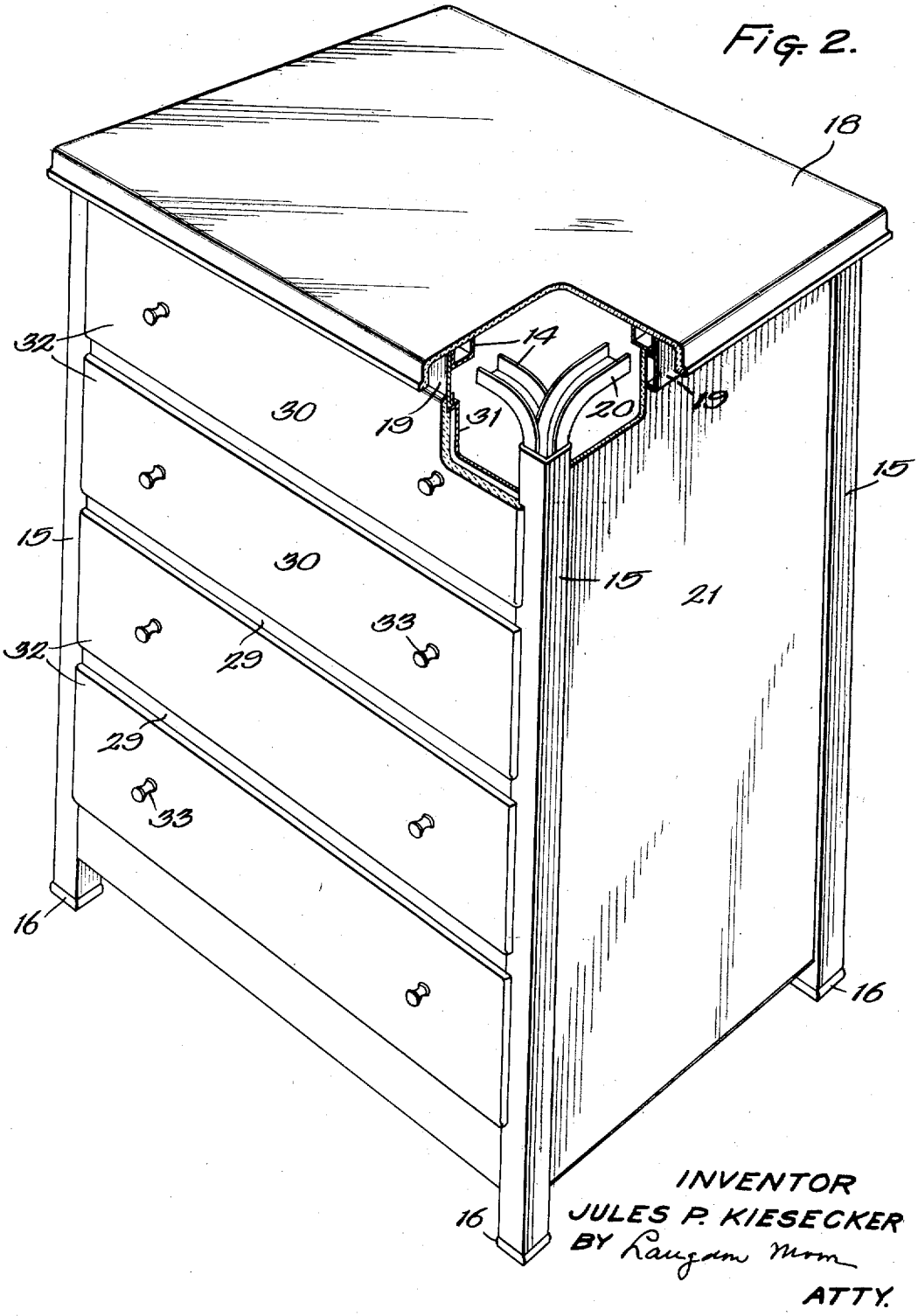
Figure 2 is a view similar to Figure 1 illustrating the application of this invention to a chest of drawers.
Figure 4:
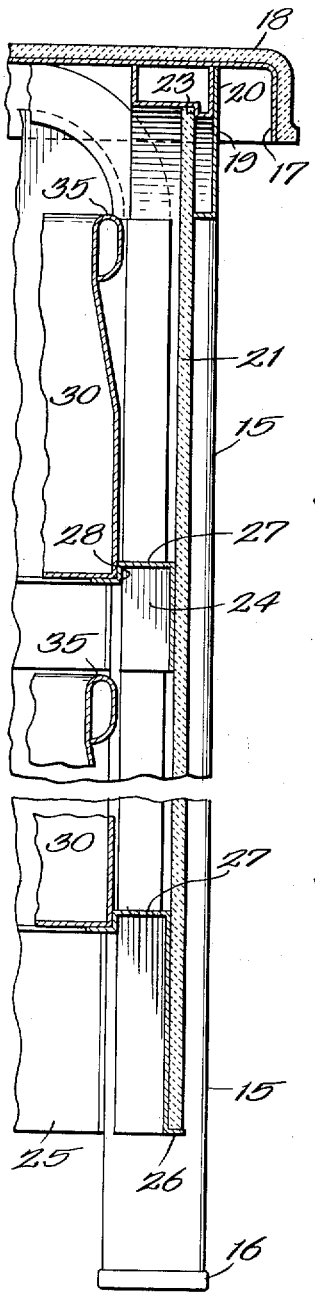
Figure 4 is a fragmentary view similar to Figure 3 taken on a plane at right angles thereto.
Figure 3:
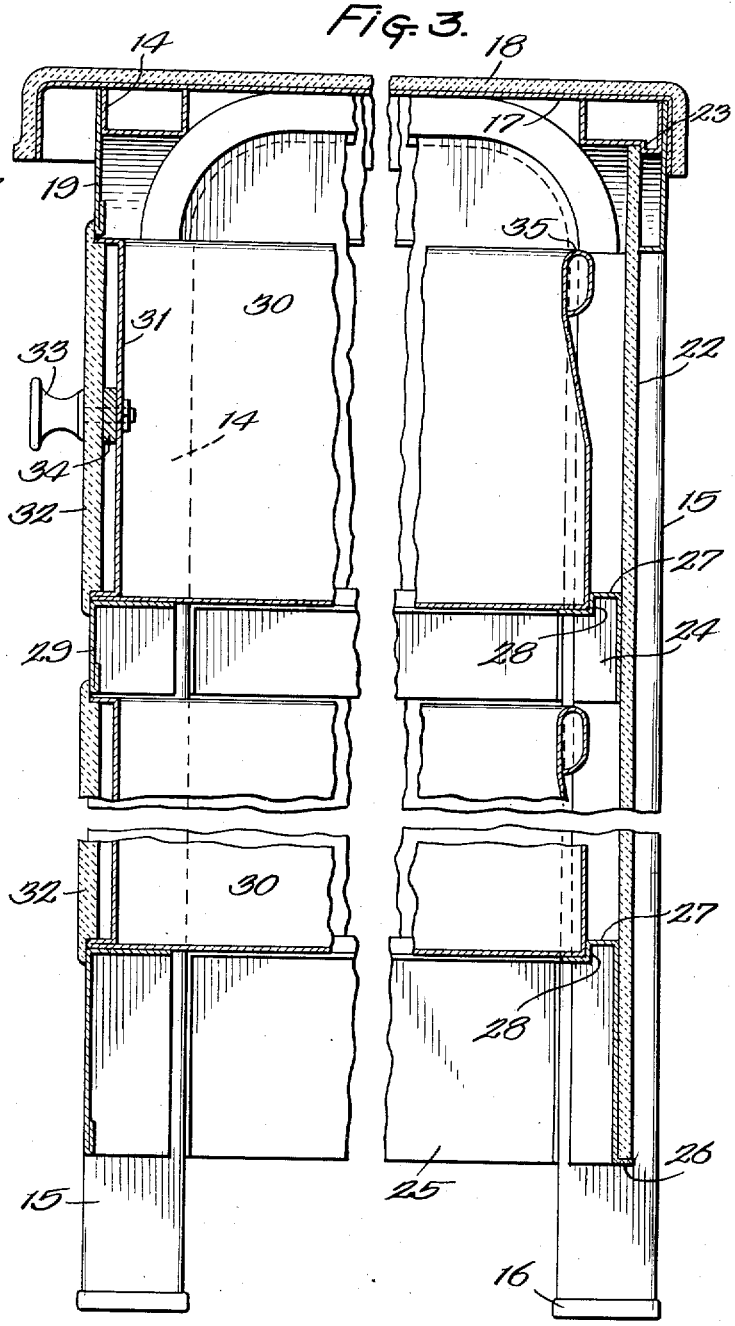
Figure 3 is a view in vertical transverse central section of Figure 3 with parts broken away.

It is contemplated to apply this invention, as well, to a chest of drawers commonly referred to in the furniture trade as highboys or lowboys according to the number of drawers or bureaus in accordance with the shape of the article. An embodiment of this application to a chest of drawers is illustrated in Figures 2, 3 and 4 of the drawings. By reference to these drawings, it is seen that the article is formed in the same manner as the frame of the chair hereinbefore described, that is, each side includes a commercial channel 14 of light weight metal bent in the form of a flat arch with the side channels interlocking with the front and back channels and preferably spot-welded thereto. The interlocking channels form the four corners of the article and are preferably covered by a light weight metal envelope 15, in the same manner as the chair leg, and the bottom of each corner is provided with a metallic foot 16 secured thereto. The top or upper surface is preferably a sheet of thin metal 17 bent down along each side, as shown, and secured to the flat portions of the channels in any desired manner and the upper surface is preferably covered with molded sheet rubber 18 in one piece.

The curved portions of the interlocking channels and the upper portion of the corner envelopes are concealed by a thin sheet metal frame 19 preferably spot-welded and depending from the flat portions 20 of the channels in the same manner as in the chair.

The side and back panels 21 and 22 are formed in a single sheet of a commercial compressed fireproof material. The channels surrounding the back and each side panel is provided with a slight offset in its web to form a shoulder 23 to be engaged by the edge of the panel and are stiffened at intervals by the light metal angularly shaped drawer runners 24, hereinafter described, which are preferably spot-welded to the channels, the lowermost of said runners 25 is provided at its lower edge with an outstanding flange 26 to engage the lower edge of each side and back panel to insure its engagement with the web of the upper flat portion of the channel, while the said runners insure the engagement of the panels with the shoulders 23 of the channels.

As shown in Figures 3 and 4, the drawer runners are constructed of strips of light metal bent to provide right angular portions lying in horizontal and vertical planes. The horizontal portions 27 of the strips forming the back and side are each provided with an offset 28, the upper part of which acts as a spacer, while the lower portion acts as a runner over which the drawer body travels. It is preferable to provide each of the strips forming the runners 24 and 25 with a flange at each end which may be spot-welded or otherwise secured to the contiguous channel and position horizontal portions of the back and side strips to engage and stiffen the back and side pannels. The front strip 29 of the runner is secured to the contiguous channels with its horizontal portion in line with the offset of the side and back strips and the lower edge of the front strip is preferably bent back upon itself to form a closure for the front of the drawer. As heretofore said, the lowermost edge of the side and back strips of the lowermost runner 25 are outwardly flanged for the purpose described.

The drawers 30 are preferably formed from a single sheet of metal with the sides thereof bent upwardly and welded at the corners. The metal of the front 31 of the drawer is preferably offset in the manner shown to receive a superimposed front 32 of a commercial compressed fireproof material which may be recessed around the edges, so that a portion of the material will extend beyond each side of the drawer, as shown and these fronts are preferably secured by knobs 33 or handles having screw-threaded projections adapted to pass through the front, a spacer block 34 interposed between the front and the metal of the drawer as well as said front and be held in place by a nut upon the interior of the drawer, as customary in wooden drawers. It is also preferable to form the metal at the top of the drawer sides and back with the round surface 35 by bending said metal outwardly therefrom in the manner shown.

The metal envelopes 15 of the corners do not entirely enclose the interlocking channels as in the chair, but terminate on the sides adjacent each other in line with the shoulder of the channels and engage the outer surfaces of the side and back fireproofing panels. The front sides of the envelopes about the front corners may be terminated in line with the web of the front channels and the front strips 29 of the runners secured to the channels in the same plane as the outer surface of the envelopes. The depending frame about the upper flat portions of the channels about the sides and back is flanged about its lower edge to engage the outer surface of the fireproofing back and side panels while the lower portion across the front is bent back upon itself, as shown in Figure 2. A chest of drawers constructed in the manner above described exposes only the metal enveloping the corners and the front strips forming the drawer runners. A chest of drawers constructed in this manner can be finished in enamel inside and outside, or the outside with a wooden veneer and in either case the suggestion of its being metal is entirely removed.

What I claim is:

1. An article of furniture including a plurality of structural metal shapes bent in the form of flat arches with angular legs depending therefrom and having the said legs adjacent each other interlocked to form the respective legs of the article, and a continuous metallic skirt supported on the flat portions of said arches depending below the curved portions thereof.

2. An article of furniture including a plurality of structural metal shapes bent in the form of flat arches with angular legs depending therefrom and having the said legs adjacent each other interlocked to form the respective legs of the article, a continuous metallic skirt supported on the flat portions of said arches depending below the curved portions thereof, and metallic envelopes surrounding the interlocking portions of the legs.

3. An article of furniture including a plurality of structural metal shapes bent in the form of flat arches with angular legs depending therefrom and having the said legs adjacent each other interlocked to form the respective legs of the article, a continuous metallic skirt supported on the flat portions of said arches depending below the curved portions thereof, metallic envelopes surrounding the interlocking portions of the legs, and a metallic frame supporting a continuous fireproof material seat or cover supported upon said flat portions.

4. An article of furniture including a plurality of structural metal shapes bent in the form of flat arches with angular legs depending therefrom and having the said legs adjacent each other interlocked to form the respective legs of the article, a continuous metallic skirt supported on the flat portions of said arches depending below the curved portions thereof, metallic envelopes surrounding the interlocking portions of the legs, a metallic frame supporting a continuous fireproof material seat or cover supported upon said flat portions and said frame positioned behind and concealed by the upper portion of said depending metallic skirt.

5. An article of furniture including a plurality of structural metal shapes bent in the form of flat arches with angular legs depending therefrom and having the said legs adjacent each other interlocked to form the respective legs of the article, and a similar bent structural metal shape having its depending angular legs interlocked with the rear interlocked legs of the article and the portions thereabove forming the back of the article.

6. An article of furniture including a plurality of structural metal shapes bent in the form of flat arches with angular legs depending therefrom and having the said legs adjacent each other interlocked to form the respective legs of the article, a similar bent structural metal shape having its depending angular legs interlocked with the rear interlocked legs of the article and the portions thereabove forming the back of the article, and a metallic brace secured to the opposite legs of the back above the interlocking of the legs.

7. An article of furniture including a plurality of structural metal shapes bent in the form of flat arches with angular legs depending therefrom and having the said legs adjacent each other interlocked to form the respective legs of the article, a continuous metallic skirt supported on the flat portions of said arches depending below the curved portions thereof, metallic envelopes surrounding the interlocking portions of the legs, a metallic frame supporting a continuous fireproof material seat or cover supported upon said flat portions forming the seat, a similar bent structural metal shape having depending angular legs interlocked with the rear interlocked legs of the article with a metal brace secured to the opposite legs above the interlocking legs forming the back of the article, and a metallic frame supporting a continuous fireproof material cover secured about the said back portion.

8. A fireproof chair including a plurality of metal channels bent in the form of flat arches with angular legs depending therefrom, said channels having their parallel flanges extending outwardly, said leg portions interlocked to form the chair legs, metal feet secured to the bottom of each leg, metal envelopes surrounding each leg below the curved portions of the channels, a continuous metal skirt having its top bent back upon itself and hooked over the outer flange of the flat portions and extending below the curved portions, an additional channel bent upon itself with its parallel flanges extending inwardly and its ends interlocked with the rear legs to form the back of the chair.

9. A fireproof chair including a plurality of metal channels bent in the form of flat arches with angular legs depending therefrom, said channels having their parallel flanges extending outwardly, said leg portions interlocked to form the chair legs, metal feet secured to the bottom of each leg, metal envelopes surrounding each leg below the curved portions of the channels, a continuous metal skirt having its top bent back upon itself and hooked over the outer flange of the flat portions and extending below the curved portions, an additional channel bent upon itself with its parallel flanges extending inwardly and its ends interlocked with the rear legs to form the back of the chair, and a cross brace channel with upstanding parallel flanges secured to the back channel above the skirt.

10. A fireproof chair including a plurality of metal channels bent in the form of flat arches with angular legs depending therefrom, said channels having their parallel flanges extending outwardly, said leg portions interlocked to form the chair legs, metal feet secured to the bottom of each leg, metal envelopes surrounding each leg below the curved portions of the channels, a continuous metal skirt having its top bent back upon itself and hooked over the outer flange of the flat portions and extending below the curved portions, an additional channel bent upon itself with its parallel flanges extending inwardly and its ends interlocked with the rear legs to form the back of the chair, a cross brace channel with upstanding parallel flanges secured to the back channel above the skirt, a continuous fireproof seat extending between the opposite sides of the metallic skirt secured to the flat portions of the leg channels and a continuous fireproof back extending between the back channel and cross brace.

11. A fireproof chair including a plurality of metal channels bent in the form of flat arches with angular legs depending therefrom, said channels having their parallel flanges extending outwardly, said leg portions interlocked to form the chair legs, metal feet secured to the bottom of each leg, metal envelopes surrounding each leg below the curved portions of the channels, a continuous metal skirt having its top bent back upon itself and hooked over the outer flange of the flat portions and extending below the curved portions, an additional channel bent upon itself with its parallel flanges extending inwardly and its ends interlocked with the rear legs to form the back of the chair, a cross brace channel with the upstanding parallel flanges secured to the back channel above the skirt, a rectangular frame received within the upstanding flanges of the flat channel portions, a plurality of spaced apart spring clips secured thereon and a continuous fireproof fabric stretched thereover to form a seat with the edges extending continuously in contact with the top of said metal skirt, and a metal frame having spaced apart spring clips with a continuous fireproof fabric stretched thereover and secured to the top and sides of the back channel and lower side of the cross brace to form a back rest.

JULES P. KIESECKER.